(12) United States Patent
Hsu

(10) Patent No.: US 11,724,761 B2
(45) Date of Patent: Aug. 15, 2023

(54) COMPOSITE BICYCLE SADDLE

(71) Applicant: Joseph Hsu, Zhongshan (CN)

(72) Inventor: Joseph Hsu, Zhongshan (CN)

( * ) Notice: Subject to any disclaimer, the term of this patent is extended or adjusted under 35 U.S.C. 154(b) by 55 days.

(21) Appl. No.: 17/491,679

(22) Filed: Oct. 1, 2021

(65) Prior Publication Data

US 2023/0082720 A1 Mar. 16, 2023

(30) Foreign Application Priority Data

Sep. 13, 2021 (TW) .................................. 110134082

(51) Int. Cl.
*B62J 1/08* (2006.01)
(52) U.S. Cl.
CPC ........................................ *B62J 1/08* (2013.01)
(58) Field of Classification Search
CPC ........................................................ B62J 1/08
See application file for complete search history.

(56) References Cited

U.S. PATENT DOCUMENTS

| 6,666,507 B1 * | 12/2003 | Ringgard | B62J 1/00 297/195.1 |
| 8,308,234 B2 * | 11/2012 | Segato | B62J 1/00 297/195.1 |
| 9,751,580 B2 * | 9/2017 | Bigolin | B32B 25/10 |
| 10,464,623 B2 * | 11/2019 | Krause | B62J 1/00 |
| 10,647,372 B2 * | 5/2020 | Bigolin | B62J 1/26 |
| 2010/0019553 A1 * | 1/2010 | Yu | B62J 1/00 297/214 |
| 2010/0032996 A1 * | 2/2010 | Lee | B62J 1/00 297/195.1 |

* cited by examiner

*Primary Examiner* — Philip F Gabler
(74) *Attorney, Agent, or Firm* — Birch, Stewart, Kolasch & Birch, LLP

(57) ABSTRACT

A composite bicycle saddle includes a saddle body that is a sandwich structure composed of an upper outer layer, a lower outer layer and an intermediate layer with the upper outer layer and the lower outer layer to be of the same material and the intermediate layer of another material, a track arranged below the saddle body, and a front binding element and two rear binding elements being having an outer end portion provided with a cylindrical joint portion. The cylindrical joint portions of the front and rear binding elements are inserted into respective mounting through holes of the track and respective through holes of the saddle body and fused and integrated with the upper outer layer and lower outer layer or the intermediate layer of the saddle body.

4 Claims, 6 Drawing Sheets

COMPOSITE BICYCLE SADDLE

BACKGROUND OF THE INVENTION

1. Field of the Invention

The present invention and related bicycle saddles, in particular, refer to a composite bicycle saddle composed of two or more materials.

2. Description of the Related Art

At present, there are many different types of bicycle saddles made of different materials on the market, and these bicycle saddles also have their own advantages and disadvantages. Early bicycle saddles were made of plastic injection and glued with a metal track. The metal track may be molybdenum steel or iron. Because the elastic coefficient of the plastic and the elastic coefficient of the metal track were quite different, the early bicycle saddles were easy to damage and heavy. Later, in order to reduce weight, the metal track was changed to a carbon fiber material. Although the weight was reduced, glue was used to bond the saddle cushion, so there was a risk of degumming. Later, carbon fiber was used to make the saddle cushion and track, and then carbon fiber was used to join the two. Although this structure can integrate the saddle cushion and the track, the manufacturing cost is too high, and it is not economical and not conducive to mass production.

SUMMARY OF THE INVENTION

The present invention has been accomplished under the circumstances in view. It is the main object of the present invention to provide a composite bicycle saddle that can improve the stability of the combination of saddle body and track and is conducive to mass production.

To achieve this and other objects of the present invention, a composite bicycle saddle comprises a saddle body, a track, and a front binding element and two rear binding elements. The saddle body is a long triangle with a narrower front end and a wider rear end. The saddle body is a sandwich structure composed of an upper outer layer, a lower outer layer and an intermediate layer. The upper outer layer and the lower outer layer being of the same material and the intermediate layer is of another material, The saddle body is provided with a through hole at the front end thereof and two through holes at the rear end thereof. The track is composed of two track struts. The track has a front end and a rear end. The two track struts are combined at the front end and then diverged toward the rear end. The track is provided with a mounting through hole at the front end and a mounting through hole at the rear end of each track strut. The track is arranged at the bottom side of the lower outer layer of the saddle body, and the three mounting through holes of the track correspond to the three through holes of the saddle body. The front binding element and the two rear binding elements each comprise an outer end portion. The outer diameter of the outer end portions is larger than the aperture of the mounting through holes of the track, and also larger than the aperture of the through holes of the saddle body. The outer end portions of the front binding element and the rear binding elements are respectively protrudingly provided with a cylindrical joint portion. The cylindrical joint portions of the front binding element and the two rear binding elements are respectively inserted into the mounting through holes of the track and the through holes of the saddle body and fused and integrated with the same material of the upper outer layer and lower outer layer or the intermediate layer of the saddle body.

It can be seen from the above structure, with the feature of the composite bicycle saddle of the present invention that the front and rear binding elements are fused and integrated with the same material of the upper outer layer and lower outer layer or the intermediate layer of the saddle body, the saddle body and the track can be firmly combined through the front and rear binding elements to improve the degumming problem of conventional products.

The detailed structure, characteristics, assembly or use mode provided by the present invention will be described in the detailed description of the subsequent preferred embodiments. However, those with ordinary knowledge in the field of the present invention should be able to understand that these detailed descriptions and specific embodiments listed in the implementation of the present invention are only used to illustrate the present invention, and are not intended to limit the scope of the patent application of the present invention.

DETAILED DESCRIPTION OF THE INVENTION

Figure 1:
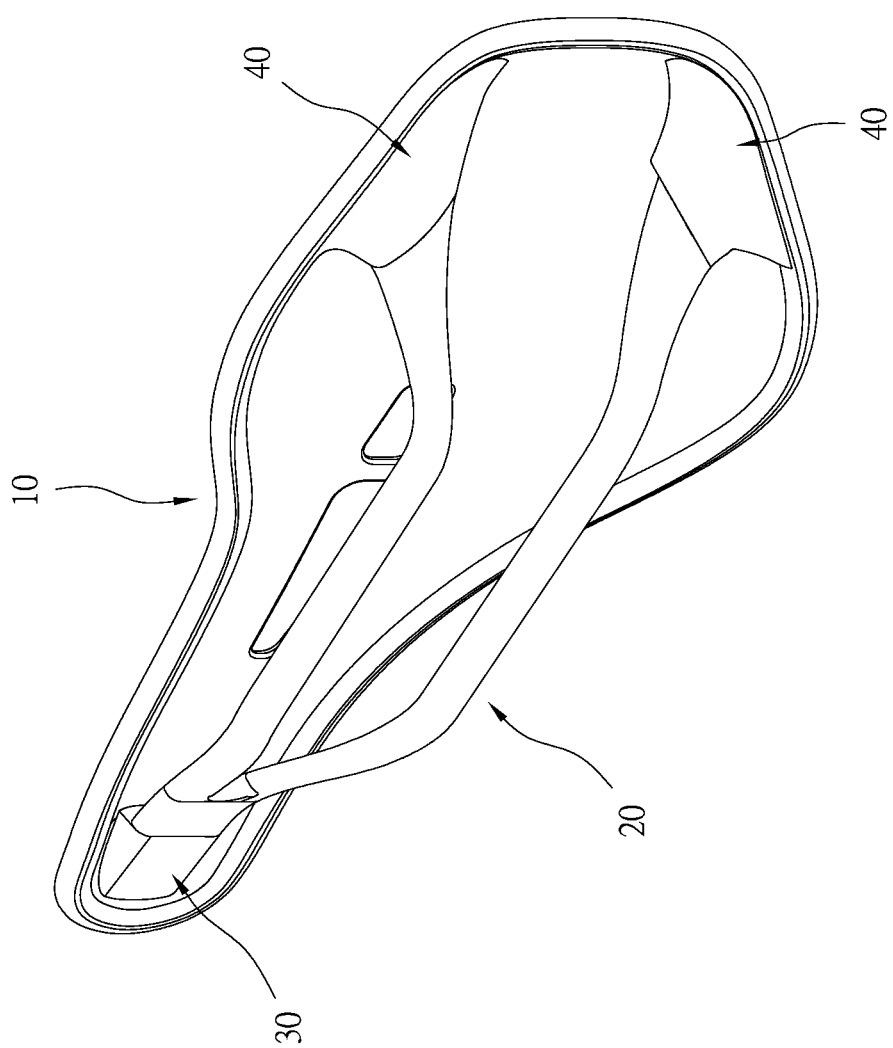
FIG. 1 is an oblique bottom elevational view of a bicycle saddle in accordance with the first embodiment of the present invention.

The applicant first explains here that throughout the specification, including the embodiments described below and the claims in the scope of the patent application, the nouns related to directionality are based on the directions in the drawings. Secondly, in the preferred embodiments and drawings that will be introduced below, the same element numbers represent the same or similar elements or their structural features.

Referring to FIGS. 1-4, a composite bicycle saddle in accordance with a first embodiment of the present invention comprises a saddle body 10, a track 20, a front binding element 30, and two rear binding elements 40.

The saddle body 10 is a long triangle with a narrower front end and a wider rear end. The saddle body is a sandwich structure composed of an upper outer layer 11, a lower outer layer 12, and an intermediate layer 13. The upper outer layer 11 and the lower outer layer 12 are of the same material, and the intermediate layer 13 is another material. In this embodiment, the intermediate layer 13 is made of plastic, and the upper outer layer 11 and the lower outer layer 12 are reinforced fiber layers, so that the plastic layer is sandwiched between the two reinforced fiber layers to form a sandwich structure. The reinforced fiber layer can be made of materials such as carbon fiber or glass fiber. The saddle body is provided with a through hole 14 at the front end and two through holes 15 at the rear end. The through hole 14 at the front end of the saddle body and the through holes 15 at the rear end run through the upper outer layer 11, lower outer layer 12 and the intermediate layer 13.

The track 20 is composed of two track struts 21. The track 20 can be made of metal materials or reinforced fibers, such as carbon fiber or glass fiber. The track 20 has a front end and a rear end, and the two track struts 21 are combined at the front end and then diverged toward the rear end. The track 20 is provided with a mounting through hole 22 at the front end and the rear end of each of the two track struts. The track 20 is arranged below the lower outer layer 12 of the saddle body, and the three mounting through holes 22 of the track correspond to the three through holes of the saddle body, and the apertures of the mounting through holes 22 are greater than or equal to the aperture of the corresponding through hole.

The front binding element 30 and the two rear binding elements 40 are made of the same material as the intermediate layer 13 of the saddle body. The front binding element and the two rear binding elements each have an outer end portion 31, 41, and the outer diameter of each of the outer end portions 31, 41 is larger than the aperture of the mounting through holes 22 on the track, and also larger than the aperture of any through hole of the saddle body. One side of the outer end portion of each binding element is protrudingly provided with a cylindrical joint portion 32, 42. The cylindrical joint portion 32 of the front binding element 30 is inserted into the mounting through hole 22 at the front end of the track and the through hole 14 at the front end of the saddle body. The cylindrical joint portions 42 of the two rear binding elements 40 are respectively inserted into the mounting through holes 22 at the rear end of the track and the through holes 15 at the rear end of the saddle body. The cylindrical joint portion of each binding element is fused and integrated with the intermediate layer 13 at the junction with the intermediate layer 13 of the saddle body.

In this embodiment, when the saddle body and the track are combined, the saddle body and the track are placed in a mold and then the front binding element and the two rear binding elements are molded by plastic injection. Because the intermediate layer and the front binding element and the two rear binding elements are made of the same material, the same material will be melted and integrated during injection molding to achieve the purpose of firmly combining the saddle body and the track.

Figure 2:
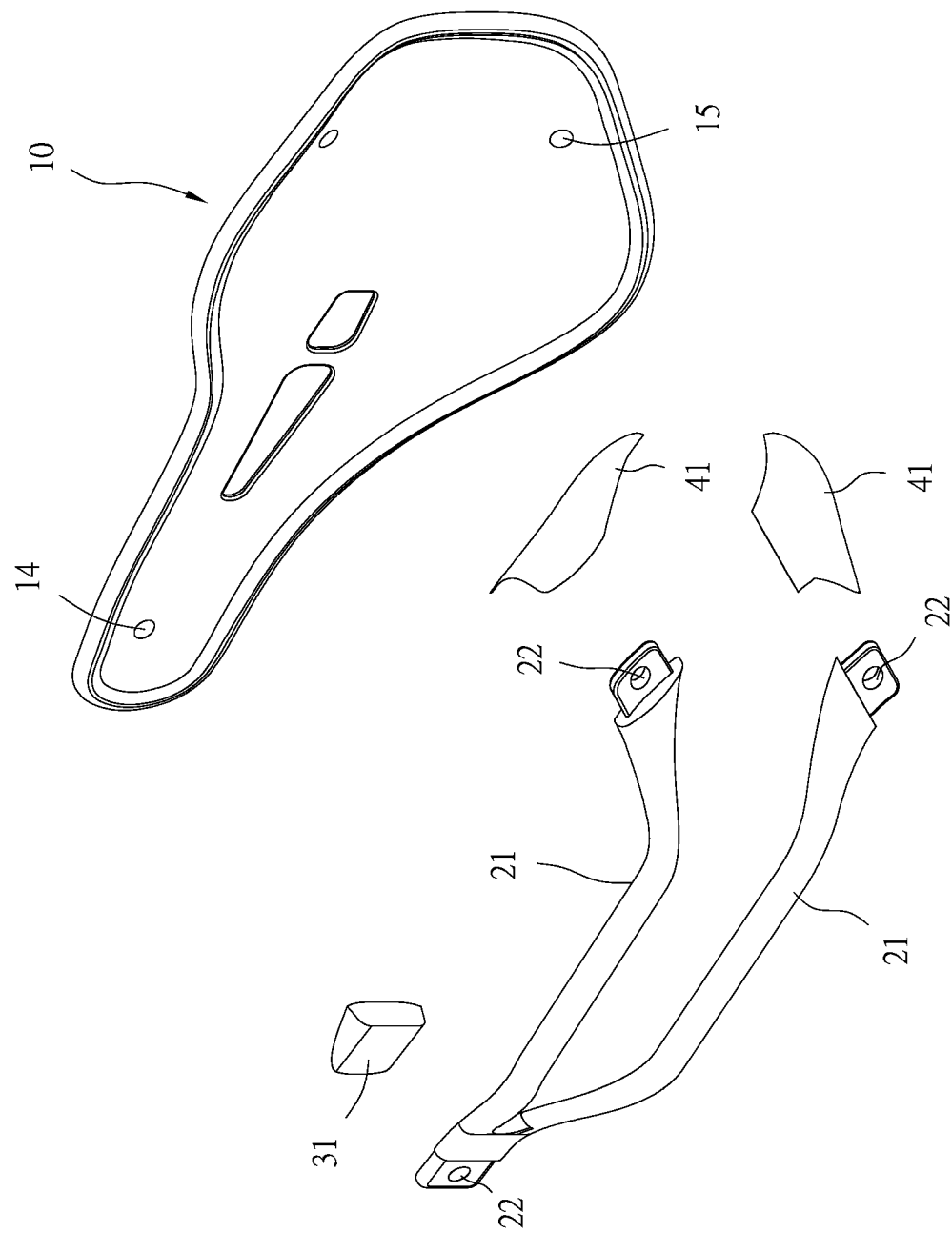
FIG. 2 is an exploded view of the bicycle saddle in accordance with the first embodiment of the present invention.
Figure 3:
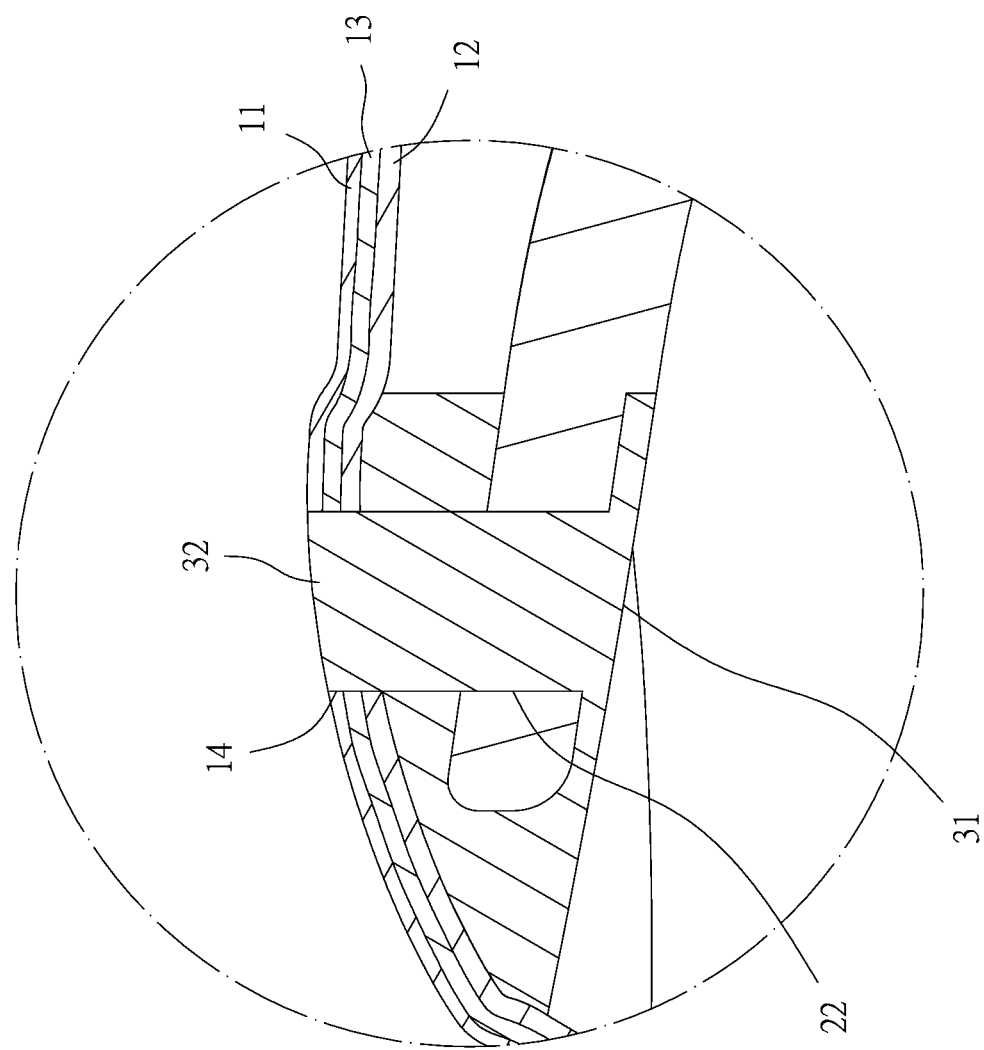
FIG. 3 is a sectional view taken along line 3-3 of FIG. 1.
Figure 4:
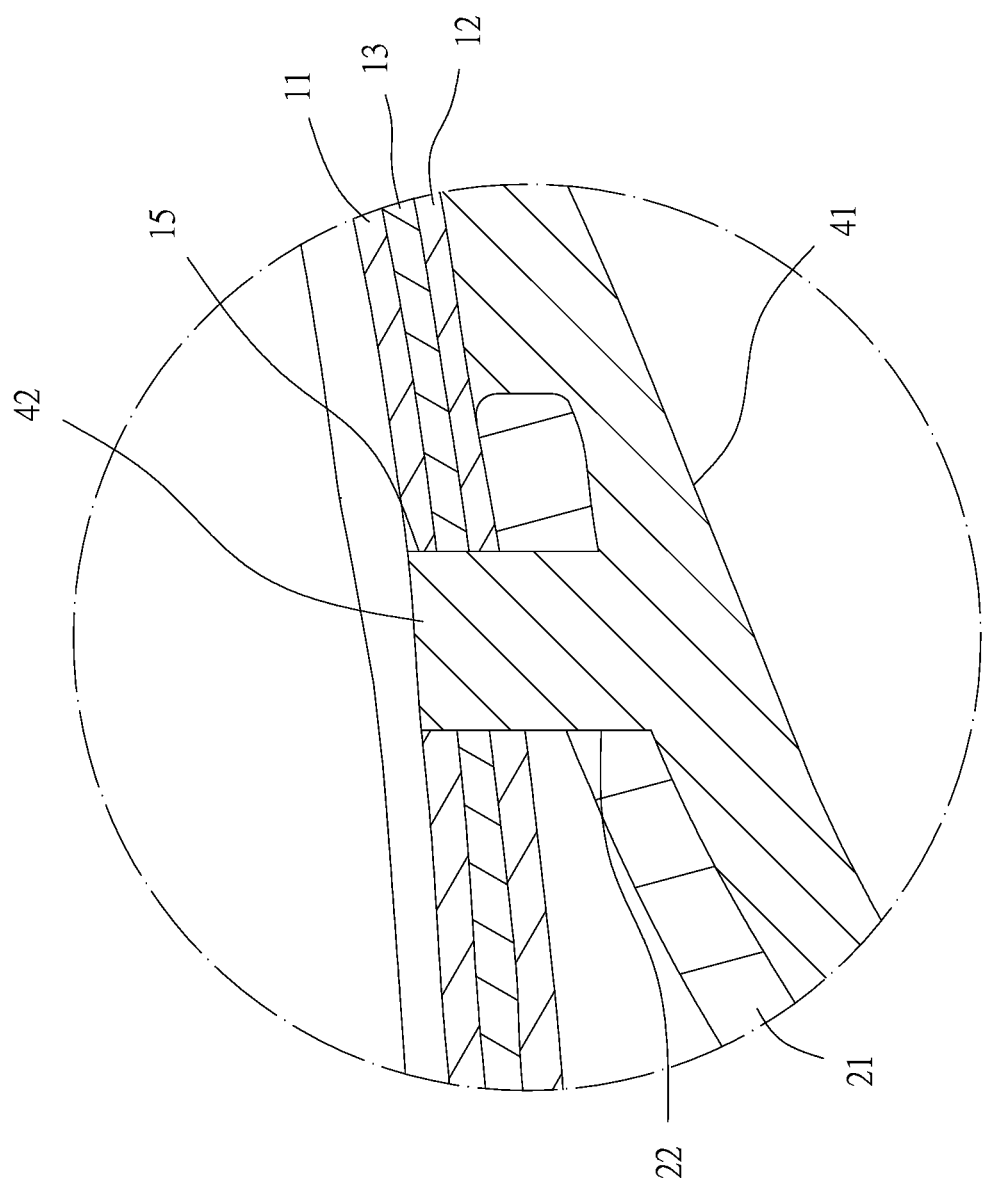
FIG. 4 is a sectional view taken along line 4-4 of FIG. 1.
Figure 5:
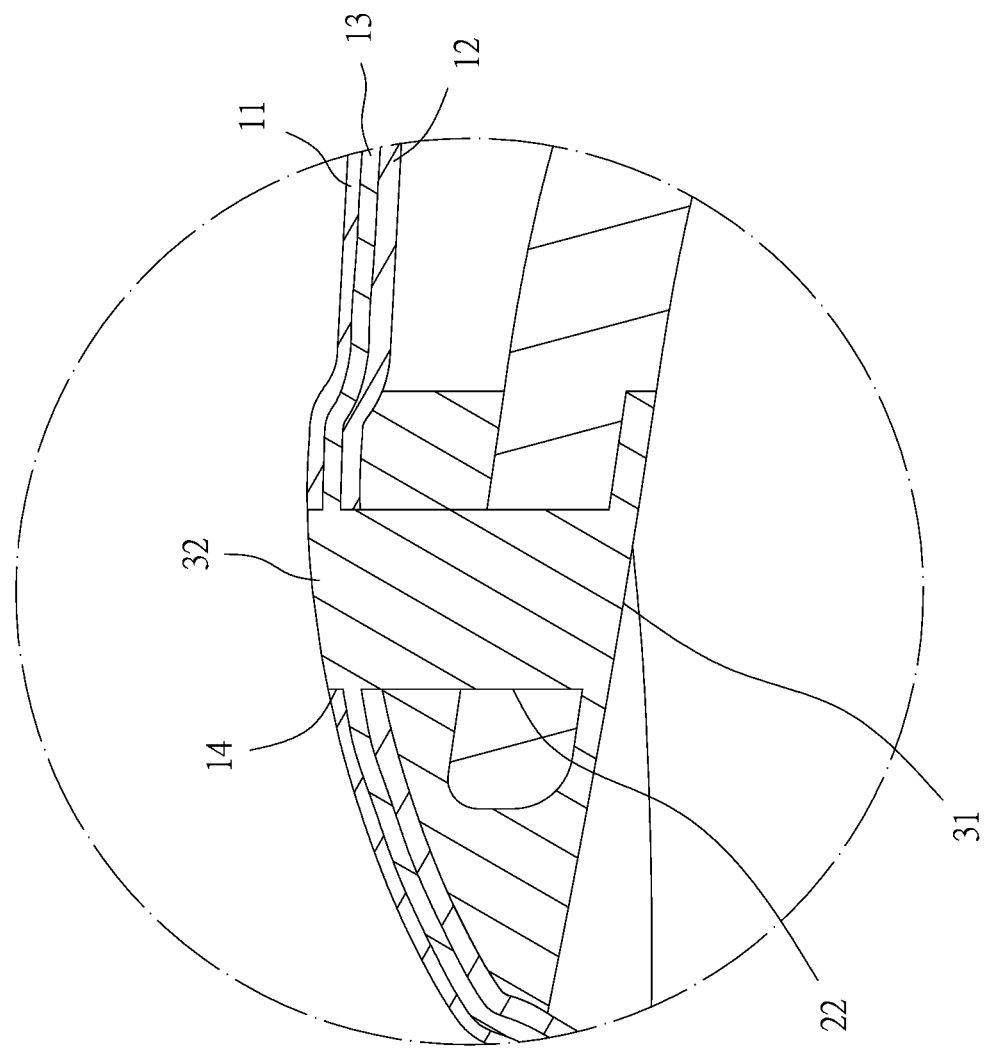
FIG. 5 is similar to FIG. 3 but shows that the cylindrical joint portions and the intermediate layer of the saddle body are fused together.
Figure 6:
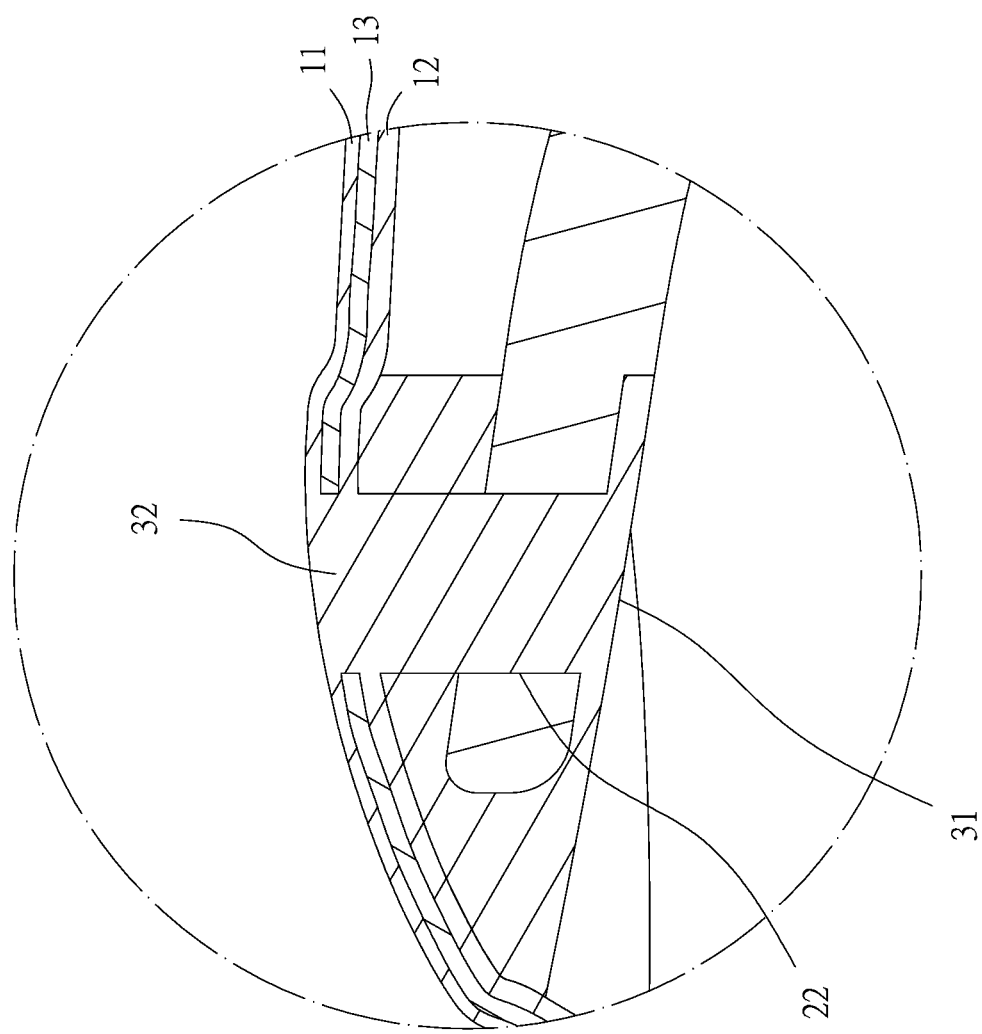
FIG. 6 is similar to FIG. 5 and is a schematic cross-sectional view of the second embodiment of the present invention.

Referring to FIGS. 2 and 6, a composite bicycle saddle in accordance with a second embodiment of the present invention comprises a saddle body 10, a track 20, a front binding element 30, and two rear binding elements 40.

The saddle body 10 is a long triangle with a narrower front end and a wider rear end. The saddle body is a sandwich structure composed of an upper outer layer 11, a lower outer layer 12, and an intermediate layer 13. The upper outer layer 11 and the lower outer layer 12 are of the same material, and the intermediate layer 13 is another material. In this embodiment, the intermediate layer 13 is made of a reinforced fiber, and the upper outer layer 11 and the lower outer layer 12 are made of plastic, so that the reinforced fiber is sandwiched between two lavers of plastic. The reinforced fiber can be made of materials such as carbon fiber or glass fiber. The saddle body is provided with a through hole 14 at the front end and two through holes 15 at the rear end. The through hole 14 at the front end of the saddle body and the through holes 15 at the rear end run through the upper outer layer 11, lower outer layer 12 and the intermediate layer 13.

The track 20 is composed of two track struts 21. The track 20 can be made of metal materials or reinforced fibers, such as carbon fiber or glass fiber. The track 20 has a front end and a rear end, and the two track struts 21 are combined at the front end and then diverged toward the rear end. The track 20 is provided with a mounting through hole 22 at the front end and the rear end of each of the two track struts. The track 20 is arranged below the lower outer layer 12 of the saddle body, and the three mounting through holes 22 of the track correspond to the three through holes 14, 15 of the saddle body.

The front binding element 30 and the two rear binding elements 40 are made of the same material as the upper outer layer 11 and lower outer layer 12 of the saddle body. The front binding element 30 and the two rear binding elements 40 each have an outer end portion 31, 41, and the outer diameter of the outer end portions is larger than the aperture of the mounting through holes 22 on the track, and also larger than the aperture of any through hole of the saddle body. One side of the outer end portion of each binding element is protrudingly provided with a cylindrical joint portion 32, 42. The cylindrical joint portion 32 of the front binding element 30 is inserted into the mounting through hole 22 at the front end of the track and the through hole 14 at the front end of the saddle body. The cylindrical joint portions 42 of the two rear binding elements 40 are respectively inserted into the mounting through holes 22 at the rear end of the track and the through holes 15 at the rear end of the saddle body. The cylindrical joint portion of each binding element is fused and integrated with the upper outer layer 11 and the lower outer layer 12 at the junction with the upper outer layer 11 and the lower outer layer 12 of the saddle body.

In this embodiment, when the saddle body and the track are combined, the saddle body and the track are placed in a mold and then the front binding element and the two rear binding elements are molded by plastic injection. Because the upper outer layer and the lower outer layer and the front binding element and the two rear binding elements are made of the same material, the same material will be melted and integrated during injection molding to achieve the purpose of firmly combining the saddle body and the track.

What is claimed is:

1. A composite bicycle saddle, comprising:
    a saddle body being a long triangle with a narrower front end and a wider rear end, said saddle body being a sandwich structure composed of an upper outer layer, a lower outer layer and an intermediate layer, said upper outer layer and said lower outer layer being of the same material and said intermediate layer being of a different material, said saddle body comprising a through hole at the front end thereof and two through holes at the rear end thereof;
    a track composed of two track struts, said track having a front end and a rear end, said two track struts being combined at said front end and then diverged toward said rear end, said track being provided with a mounting through hole at said front end and a mounting through hole at a rear end of each of said two track struts at said rear end, said track being arranged at a bottom side of said lower outer layer of said saddle body, and the said three mounting through holes of said track corresponding to the said three through holes of said saddle body; and
    a front binding element and two rear binding elements, said front binding element and said two rear binding elements each comprising an outer end portion, the outer diameter of said outer end portions being larger than the aperture of said mounting through holes of said track, and also larger than the aperture of said through holes of said saddle body, said outer end portions of said front binding element and said rear binding elements each being protrudingly provided with a cylindrical joint portion, the said cylindrical joint portion of said front binding element being inserted into the said mounting through hole at the front end of said track and the said through hole at the front end of said saddle body, the said cylindrical joint portions of said two rear binding elements being respectively inserted into the said mounting through holes at the rear end of said track and the through holes at the rear end of said saddle body, wherein said front binding element and said two rear binding elements are made of the same material as said intermediate layer of said saddle body, and the said cylindrical joint portions of said front binding element and said two rear binding elements are fused and integrated with said intermediate layer at the junction with said intermediate layer of said saddle body.

2. The composite bicycle saddle as claimed in claim 1, wherein said intermediate layer is made of plastic.

3. The composite bicycle saddle as claimed in claim 2, wherein said upper outer layer and said lower outer layer are made of reinforced fiber.

4. The composite bicycle saddle as claimed in claim 3, wherein said reinforced fiber is selectively carbon fiber or glass fiber.

* * * * *